May 25, 1926. 1,585,849
E. GINDRE
MEANS FOR CONNECTING ELECTRIC CABLES TO CARBON BRUSHES OR THE LIKE
Filed Nov. 17, 1924

Inventor
E. Gindre
by Marks Clerk
Attys.

Patented May 25, 1926.

1,585,849

UNITED STATES PATENT OFFICE.

EUGÈNE GINDRE, OF LEVALLOIS-PERRET, FRANCE, ASSIGNOR TO SOCIÉTÉ ANONYME LE CARBONE, OF LEVALLOIS-PERRET, FRANCE.

MEANS FOR CONNECTING ELECTRIC CABLES TO CARBON BRUSHES OR THE LIKE.

Application filed November 17, 1924. Serial No. 750,418.

It is already known that a flexible electric conductor can be connected to a carbon brush for use with electric machines by pressing the opened out end of this cable under collars provided on a tubular rivet passing through the brush. When turning over one of the ends of this rivet so as to ensure the fixing of the electric cable it is at the same time necessary to press or grip the cable which constitutes a double effort very difficult to obtain exactly. Hence although this connection may be satisfactory in principle it often happens that the contact between the conductor and the brush is imperfect.

Now the object of the present invention is to ensure a reliable and good contact in connections of this kind. It is characterized essentially by the combination of a washer with the tubular rivet, the cable and the brush suitably machined, said washer having a cylindrical part by which the washer may be guided upon the rivet and preventing any jamming of the strands of the cable. The cable can therefore be firmly gripped or pressed by the fixing of the rivet thus ensuring a good contact of the elements.

Furthermore the washer has a conical part which sets aside the strands of the cable and upon which the end of the rivet is turned when the connection is effected.

To assist comprehension of the invention there is shown in the accompanying drawings by way of example only, one method of carrying out the invention and wherein:—

Figure 2:
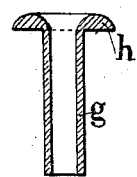
Figure 2 is a section of the rivet.

Referring to the drawings the block of carbon $a$ has a passage $b$, terminating at each end in recesses $c$ and $d$, the recess $d$ being the larger and having a hole $e$ for the cable $f$ opening into it.

Figure 3:
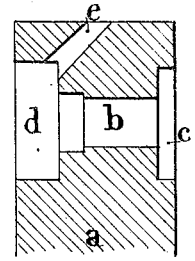
Figure 3 shows the three phases in the manufacture of the washer.
Figure 1:
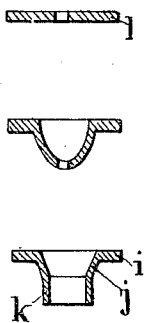
Figure 1 is a sectional view of the block of carbon forming the body of the brush.
Figure 4:
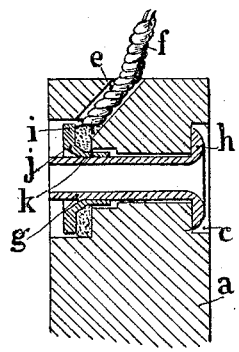
Figure 4 shows the parts when assembled.
Figure 6:
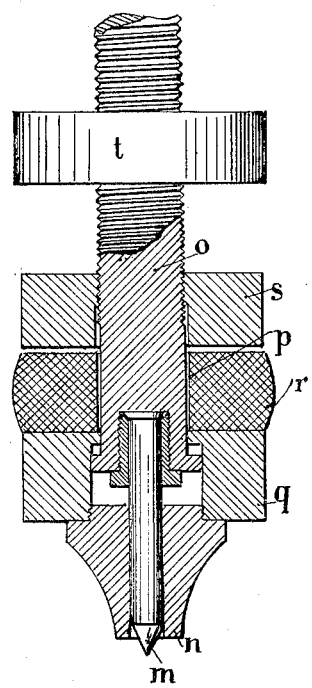
Figure 6 is a section of the machine serving to effect the connection by fixing the rivet.
Figure 5:
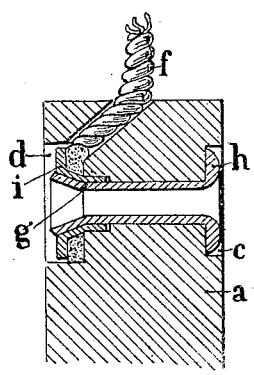
Figure 5 shows the parts after the rivet has been fixed.

The fixing is effected by means of a tubular rivet $g$ (Figure 2) provided with a collar $h$ and a washer $i$ (Fig. 3), intended to be passed on to the shank of this rivet. This washer has a shoulder $j$ in the form of a truncated cone and a cylindrical shank $k$. It can be obtained, for example, as indicated in the drawings from a flat disc 1 by stamping it in two phases as shown.

In order to effect the fixing of the several parts the cable $f$ is introduced into the hole $e$ and the rivet $g$ is then placed in position. The strands of the cable are divided and on each side of the rivet and the washer $i$ is then placed on the rivet, its cylindrical shank $k$ being interposed between the strands of the cable and the rivet. Then with the assistance of a tool, pressure is brought to bear upon the washer $i$ and greater pressure is exerted upon the rivet with a tool which expands the end of it. In this manner the strands of the conductor are tightly pressed between the inner face of the washer and the surface of the brush. The effect of this operation is also to turn down upon the upper inner edge of the washer the end of the tubular rivet thus ensuring an absolutely rigid connection of the several parts.

It will be remarked that in the operation of the riveting, the cylindrical part $k$ of the washer $i$ results in a perfect guiding of the latter upon the rivet and it also prevents strands of the cable from being able to engage between the washer and the rivet and cause its jamming. The conical part $j$ sets apart the strands of the cable and contributes to produce a good gripping of the latter between the carbon and the washer $i$.

The above arrangements have been described by way of example only; the forms, material used and all the detailed arrangements may be varied in all cases without departing from the principle of the invention.

Claims:

1. Means for connecting electric cables to a carbon brush, comprising a tubular rivet adapted to be engaged in the notch or depression provided in the carbon brush, a cable locking member formed by a cylindrical body adapted to slide along the tubular body of said rivet and having at one of its ends an annular base intended to be fastened onto the cable to be attached, the end of the tubular body of the rivet being fastened to said member by pressure.

2. Means for connecting electric cables to a carbon brush comprising a tubular rivet adapted to be engaged in a notch provided in the carbon brush, a cable locking member formed as a cylindrical member adapted to slide along the tubular body of said rivet, an annular base intended to hold the cable to be attached, and a trunconic member joined to said base and the cylindrical body, the end of the tubular body of the rivet being forced against the wall of the trunconic member.

The foregoing specification of my "improvements in or relating to means for connecting electric cables to carbon brushes or the like", signed by me this 7th day of November, 1924.

EUGÈNE GINDRE.